United States Patent
Zhang

(10) Patent No.: US 10,495,768 B2
(45) Date of Patent: Dec. 3, 2019

(54) METHOD OF OPERATING A DATA-PROCESSING SYSTEM FOR THE SIMULATION OF THE ACOUSTIC WAVE PROPAGATION IN THE TRANSVERSELY ISOTROPIC MEDIA COMPRISING AN HYDROCARBON RESERVOIR

(71) Applicant: REPSOL EXPLORACION, S.A., Madrid (ES)

(72) Inventor: Qunshan Zhang, The Woodlands, TX (US)

(73) Assignee: REPSOL EXPLORACIÓN, S.A., Madrid (ES)

(*) Notice: Subject to any disclaimer, the term of this patent is extended or adjusted under 35 U.S.C. 154(b) by 844 days.

(21) Appl. No.: 15/078,325

(22) Filed: Mar. 23, 2016

(65) Prior Publication Data

US 2017/0276814 A1    Sep. 28, 2017

(51) Int. Cl.
*G01V 1/28* (2006.01)
*G06F 17/11* (2006.01)

(52) U.S. Cl.
CPC .............. *G01V 1/282* (2013.01); *G06F 17/11* (2013.01); *G01V 2210/679* (2013.01)

(58) Field of Classification Search
None
See application file for complete search history.

(56) References Cited

U.S. PATENT DOCUMENTS

2013/0060544 A1   3/2013   Bakker et al.

FOREIGN PATENT DOCUMENTS

GB      2520979 A      6/2015
WO   2015104386 A2    7/2015

OTHER PUBLICATIONS

H. Zhou et al., "An anisotropic acoustic wave equation for VTI media," Jun. 2006, EAGE 68th Conference & Exhibition, five pages (Year: 2006).*
Duveneck, E. et al., "Acoustic VTI wave equations and their application for anisotropic reverse-time migration," 2008, SEG 2008 Annual Meeting, five pages (Year: 2008).*
Yu Zhang et al., "A stable TTI reverse time migration and its implementation," 2009, SEG 2009 Annual Meeting, five pages (Year: 2009).*
"Polarization-based wave-equation migration velocity analysis in acoustic media", Qunshan Zhang, Geophyics, vol. 78, No. 6, Nov.-Dec. 2013.
"Direct vector-field method to obtain angle-domain common-image gathers from isotropic acoustic and elastic reverse time migration", Qunshan Zhang, Geophyics, vol. 76, No. 5, Sep.-Oct. 2011.

(Continued)

*Primary Examiner* — Kamini S Shah
*Assistant Examiner* — Russ Guill
(74) *Attorney, Agent, or Firm* — Reising Ethington, P.C.

(57) ABSTRACT

A computer implemented method including a numerical model of a region of the earth modeling the acoustic behavior of that region. The method implements an acoustic wave propagator allowing the simulation of the propagation of pure P-waves in transversal isotropic media. The propagator can be applied to applications such as seismic forward modeling, reverse time migration and other two-way wave-equation based applications.

11 Claims, 5 Drawing Sheets

(56) References Cited

OTHER PUBLICATIONS

"Coupled equations for reverse time migration in transversely isotropic media", Paul J. Fowler, Geophyics, vol. 75, No. 1, Jan.-Feb. 2010.
"Approximation of pure acoustic seismic wave propagation in TTI media", Chunlei Chu, Geophyics, vol. 76, No. 5, Sep.-Oct. 2011.
"An acoustic wave equation for orthorhombic anisotropy", Tariq Alkhalifah, Geophyics, vol. 68, No. 4, Jul.-Aug. 2003.
"Accurate simulations of pure quasi-P-waves in complex anisotropic media", Sheng Xu, Geophyics, vol. 79, No. 6, Nov.-Dec. 2014.
Qunshan Zhang et al.; article titled "Pure acoustic P-wave equation of motion in TTI and orthorhombic media," SEG Technical Program Expanded Abstracts 2015, published on Aug. 19, 2015; 6 pages.
International Search Report for International Application No. PCT/EP2017/056809 dated Jun. 16, 2017, 4 pages.
Yu Zhang et al.; article titled "A stable TTI reverse time migration and its implementation." Geophysics, Society of Exploration, US, vol. 78, No. 3, May 1, 2011; 9 pages.

* cited by examiner

S-wave Noise

S-wave noise free

METHOD OF OPERATING A DATA-PROCESSING SYSTEM FOR THE SIMULATION OF THE ACOUSTIC WAVE PROPAGATION IN THE TRANSVERSELY ISOTROPIC MEDIA COMPRISING AN HYDROCARBON RESERVOIR

FIELD OF THE INVENTION

The present invention is related to a computer implemented invention comprising a numerical model of a region of the earth modeling the acoustic behavior of said region. The invention is based on a new acoustic wave propagator allowing the simulation of the propagation of pure P-waves in transversal isotropic media.

The propagator can be applied to applications such as seismic forward modeling, reverse time migration and other two-way wave-equation based applications.

PRIOR ART

Seismic exploration has been used to image subsurface geological structures by oil industry. In an experiment of seismic exploration, a source at the surface or subsurface emits wavefields and then wavefields propagate downward into subsurface. The down-going wavefields are reflected/diffracted by the interfaces of the structures and then propagate upward to the surface where groups of sensors are planted with the certain limited distances from the source to acquire the reflected wavefields.

The acquired wavefields from a single source are called a common shot recorder (gather) or referred as raw field seismic data. To explore a larger area, thousands of experiments are required to exercise in the designed layout.

The acquired wavefields from an individual experiment are migrated to image the subsurface structures adjacent to the source according to the wave propagation theory with assuming the velocity model of subsurface.

To image the area, migration is performed on all experiments and results from all migrations are stacked together respective to the source locations. This process is referred as pre-stack migration.

The pre-stack migration can be performed in either time or depth domain algorithms. In the time domain, the migrated results are expressed in the product of vertical propagating velocity of seismic wave and the vertical depth propagated, which is referred as pre-stack time migration.

In the depth domain, the migrated results are expressed in the vertical depth propagated, which is referred as pre-stack depth migration.

Pre-stack time migration only can image simple structures correctly while pre-stack depth migration can image complicated structures with high fidelity. However, pre-stack time migration requires much less computational cost than pre-stack depth migration.

In a special case if the sensors are only placed in the same location as source's location, the acquired field seismic wavefields are referred as zero offset seismic data. All zero offset seismic data from different experiments are migrated simultaneously to image the structures. This process is called as post-stack migration.

As similar to the pre-stack migration, post-stack migration also can be categorized as post-stack time migration and post-stack depth migration.

However, in most cases, zero offset seismic data are derived by processing normally acquired seismic data using geophysical algorithms instead of directly acquiring in the field un-efficiently. The computational cost for post-stack migration is much less than pre-stack migration.

De-migration is a reverse process of migration to derive raw seismic data comparable to common shot gathers (pre-stack de-migration) or zero offset seismic data (post-stack de-migration) acquired in the field. Similar to migration, de-migration can also be implemented in both time and depth domains. De-migration requires image from the migration and the velocity model used in the migration.

Anisotropic media shows different acoustic rock impedances between at least two media, defining interfaces causing reflections and diffractions along said interfaces.

Physical anisotropy results in waves propagating at different velocities in different directions, resulting in a non-spherical wave front at zero-offset.

Tilted transversely isotropic media (TTI) increases the complexity of the computations as the wave propagation must take into account the dip angle of reflectors but in practice, most of real examples are TTI media rather than being just vertical isotropic media (VTI). TTI media does add more algebraic complexity.

The earth media is very complex and due to computing cost and limitations, industry has to simplify earth models to run applications on real production. Recently, titled transverse isotropy media has been considered a very close approximation to earth real media in oil and gas industry.

Based on acoustic assumptions, subsurface imaging and velocity models are built. Approximating the full elastic wave equations is computationally much more expensive than modeling acoustic waves. Rather than solving anisotropic elastic-wave equations, simpler two-way wave equations are commonly derived for instance allowing to solve efficiently pseudo-acoustic anisotropic reverse time migrations (RTM).

Reverse time migration needs accurate and efficient schemes for modeling P-waves in transversal media. Asymptotic analysis of free-space propagation of P-waves and SV-waves in vertical transversal media yields to a dispersion relation, providing a fourth-order partial differential equation in time and space comprising a mix of space and tie derivatives for an generic scalar wavefield variable.

Most of current reverse time algorithms image only P-waves. According to the prior art, two coupled equations satisfying the fourth-order partial differential equation is solved wherein these two coupled system of equations has only second-order time derivatives allowing the use efficient standard methods. These two equations may be written as:

$$\frac{\partial^2 q}{\partial t^2} = v_{px}^2 \left( \frac{\partial^2 q}{\partial x^2} + \frac{\partial^2 q}{\partial y^2} \right) + v_{px}^2 \frac{\partial^2 q}{\partial z^2} + \alpha \sqrt{(v_{pz}^2 - v_{sz}^2)(v_{pn}^2 - v_{sz}^2)} \frac{\partial^2 r}{\partial z^2}$$

$$\frac{\partial^2 r}{\partial t^2} = \frac{1}{\alpha} \sqrt{(v_{pz}^2 - v_{sz}^2)(v_{pn}^2 - v_{sz}^2)} \, v_{px}^2 \left( \frac{\partial^2 q}{\partial x^2} + \frac{\partial^2 q}{\partial y^2} \right) + v_{sz}^2 \left( \frac{\partial^2 r}{\partial x^2} + \frac{\partial^2 r}{\partial y^2} \right) + v_{pz}^2 \frac{\partial^2 r}{\partial z^2}$$

wherein q and r are scalars satisfying the general forth-order partial differential equation, q is interpreted as the P-wave wavefield and r is an extra component; $v_{pz}$ is the P-wave velocity along the symmetry axis of anisotropic medium direction, $v_{px}=v_{pz}\sqrt{1+2\varepsilon}$ is the horizontal P-wave velocity; $v_{pn}=v_{pz}\sqrt{1+2\delta}$ is the P-wave move out velocity relative to the symmetry axis; $v_{sz}$ is the SV-wave velocity along the symmetry axis of anisotropic medium direction; $\alpha = v_{pz}/v_{pn}$, and $\varepsilon$ and $\delta$ are the anisotropic parameters defined by Thomsen.

Models for VTI media are fully characterized by five elastic parameters and the density. Models for orthorhombic media further comprise four additional elastic parameters and the density.

Explicitly, if the stiffness tensor $c_{ijkl}$ is represented for orthorhombic media, said tensor may be represented in a compressed two-index notation as follows:

$$C = \begin{pmatrix} c_{11} & c_{12} & c_{13} & 0 & 0 & 0 \\ c_{12} & c_{22} & c_{23} & 0 & 0 & 0 \\ c_{13} & c_{23} & c_{33} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{66} \end{pmatrix}$$

wherein in VTI media $c_{11}=c_{22}$, $c_{13}=c_{23}$, $c_{44}=c_{55}$, and $c_{12}=c_{11}-2c_{44}$.

Even if the two-equation formulation based on q and r variables results very accurate, for instance when using pseudo-spectral methods for discretizing the continuous problem, as it removes the SH-wave noise, the SV-wave noise cannot be removed reducing the quality of applications such as the reverse time migration of image, forward modelling, or any other associated application of the two-wave propagation equations.

Some alternatives have been proposed for reducing the shear wave (SV-wave) noise but these alternate methods provide amplitudes that are not correct.

The present invention avoids the use of the system of two-equations and provides an alternative wave-propagator for generating only P-waves in VTI and TTI anisotropic media. The proposed propagator does not have the implementation limitations of the pseudo-spectral method, amplitudes are correct, and it is cost effective. As it will be shown in the detailed examples of the invention, the RTM impulse response and forward modelling examples shown demonstrate the validity of this method.

DESCRIPTION OF THE INVENTION

The method according to a first aspect of the invention is a computer implemented invention allowing the simulation of the propagation of pure P-waves in transversal isotropic media.

The instant invention does not have the implementation limitations of the pseudo-spectral methods, amplitudes of the wavefield are correct and it is cost effective. The computer implemented method comprises a numerical model of a region of the earth modeling the acoustic behavior of said region. The invention is based on a new acoustic wave propagator allowing the simulation, by means of numerical methods, of the propagation of pure P-waves in transversal anisotropic media.

The method according to said first aspect of the invention is a method of operating a data-processing system for the simulation of the acoustic wave propagation in the transversely isotropic media comprising a hydrocarbon reservoir, comprising:

a) determining the domain comprising the reservoir, wherein said domain comprises subsurface points and surface points;

b) populating the domain with properties of an earth model, wherein said earth model at least comprises the velocity field $V_z$ along the direction of the symmetry axis of the transversely isotropic medium;

c) determining absorbing free boundary conditions for the boundaries corresponding to the subsurface points and boundary conditions comprising one or more predetermined acoustic sources emitting at certain frequency located at the surface of the domain; and initial conditions;

d) automatically solving, via the data-processing system, forward in time the earth model in the domain by using the wavefield propagator defined by the equation:

$$\frac{1}{V_z^2}\frac{d^2 u}{dt^2} = (1+2\varepsilon)\left(\frac{\partial^2 u}{\partial x^2} + \frac{\partial^2 u}{\partial y^2}\right) + \frac{\partial^2 u}{\partial z^2} +$$

$$(\varepsilon - \delta)\frac{\left(\left(\frac{\partial u}{\partial x}\right)^2 + \left(\frac{\partial u}{\partial y}\right)^2\right)\frac{\partial^2 u}{\partial z^2} + \left(\frac{\partial u}{\partial z}\right)^2\left(\frac{\partial^2 u}{\partial x^2} + \frac{\partial^2 u}{\partial y^2}\right)}{(1+2\varepsilon)\left(\left(\frac{\partial u}{\partial x}\right)^2 + \left(\frac{\partial u}{\partial y}\right)^2\right) + \left(\frac{\partial u}{\partial z}\right)^2}$$

wherein the u is the wavefield, $\varepsilon$ and $\delta$ are anisotropic parameters, (x, y) the spatial coordinates at the surface of the domain and z de spatial coordinate in the depth direction and t the time coordinate; and, e) making available the wavefield determined on the domain.

The domain comprises a surface where the shots are located and a sub-surface domain where the acoustic P-waves propagate. The domain is populated with the properties providing an earth model, at least the $V_z$ velocity along the direction of the symmetry axis of anisotropic medium and the anisotropic parameters $\varepsilon$ and $\delta$.

The proposed single equation avoids the use of two-coupled equations and square roots operators providing a wave-field propagator free of noise and with a lower computational cost. The equation itself does not have shear wave content and provides a behavior of the solution accurate.

Once the boundary and initial conditions are imposed over the partial differential equation defined in step d), a wavefield over the entire domain is obtained. According to an embodiment, the boundary conditions for the boundaries corresponding to the subsurface points are absorbing free conditions.

This domain may be a 3D domain wherein x,y are the surface domain; and z the depth domain; or a 2D domain wherein y is not explicitly used and the associated terms neglected in the equation.

According to preferred embodiments, the implemented method solves the equation of step d) by discretizing the domain using a specific numerical method like finite-differences, finite-volumes or pseudo-spectral method. The resulting discretized system of equations, being free of shear-wave noise, has been tested and is free of instability issues.

According to the prior art, the two-equations solved for simulating the wavefield describes the P-waves and the SV-waves and the SV waves are set to zero or to a small number; however, due to the combination of P-waves and SV-waves in the coupled equations, SV-wave exists even if set to zero.

The shear wave velocity is lower than P-waves and the coupling imposes a time increment for the numerical integration in time limited by said lower velocity.

As the present invention solves an alternative equation only for P-waves the stability condition is not so limited. As the present invention uses just one equation rather than a pair of equations as it is well known in the prior art, the computational resources, CPU time and memory, needed for the simulation is highly reduced.

According to another embodiment, the initial conditions comprise a plurality of receivers located at predetermined locations of the surface of the domain being simulated. In a further step the wavefield generated by the acoustic sources are being interpolated and gathered in each receiver; and, finally the output of the receivers are made available.

The equation of step d) is valid for vertical transversely isotropic media. If the axis of the transversely anisotropic media (VTI) is rotated, then the equations are transformed including the tilt angle $\theta$ and the azimuth angle $\phi$. The rotated equation may be expressed as:

$$\frac{1}{V^2}\frac{d^2 u}{dt^2} = [pa_{xy} \; pa_{az}]\begin{bmatrix} xy_{11} & z_{13} \\ xy_{21} & z_{23} \\ xy_{31} & z_{33} \\ xy_{41} & z_{43} \\ xy_{51} & z_{53} \\ xy_{61} & z_{63} \end{bmatrix}\begin{bmatrix} \frac{\partial^2 u}{\partial x^2} \\ \frac{\partial^2 u}{\partial y^2} \\ \frac{\partial^2 u}{\partial z^2} \\ \frac{\partial^2 u}{\partial x \partial y} \\ \frac{\partial^2 u}{\partial y \partial z} \\ \frac{\partial^2 u}{\partial z \partial x} \end{bmatrix} \text{ where}$$

$$pa_{xy} = (1+2\varepsilon)V^2 + (\varepsilon-\delta)V^2\frac{\left(\frac{\partial u}{\partial z}\right)^2}{(1+2\varepsilon)\left(\left(\frac{\partial u}{\partial x}\right)^2+\left(\frac{\partial u}{\partial y}\right)^2\right)+\left(\frac{\partial u}{\partial z}\right)^2};$$

$$pa_{az} = (1+2\varepsilon)V^2 + (\varepsilon-\delta)V^2\frac{\left(\frac{\partial u}{\partial x}\right)^2+\left(\frac{\partial u}{\partial y}\right)^2}{(1+2\varepsilon)\left(\left(\frac{\partial u}{\partial x}\right)^2+\left(\frac{\partial u}{\partial y}\right)^2\right)+\left(\frac{\partial u}{\partial z}\right)^2};$$

$z_{13} = \cos^2(\phi) \cdot (1-\cos^2(\theta));$ $xy_{21} = \cos^2(\theta) * (1-\cos^2(\phi)) + \cos^2(\phi);$ $z_{33} = \cos^2(\theta);$ $z_{43} = 2(1-\cos^2(\theta)) \cdot \sin(\phi)\cos(\phi);$ $xy_{51} = 2\sin(\theta)\cos(\theta) \cdot \sin(\phi);$ $xy_{61} = 2\sin(\theta)\cos(\theta) \cdot \cos(\phi);$ $xy_{11} = 1 - z_{13};$ $z_{23} = 1 - xy_{21};$ $xy_{31} = 1 - z_{33};$ $xy_{41} = 1 - z_{43};$ $z_{53} = 1 - xy_{51};$ $z_{63} = 1 - xy_{61}.$ Some embodiments of numerical models comprising the proposed wavefield propagator will be disclosed below.

A further embodiment provides additional parameters to the elastic stiffness tensor allowing to simulate orthorhombic conditions,. In this embodiment the propagator may be expressed as:

$$\frac{d^2 u}{dt^2} = N\frac{\partial^2 u}{\partial x^2} + P\frac{\partial^2 u}{\partial y^2} + Q\frac{\partial^2 u}{\partial z^2} \text{ where}$$

$$N = V_1^2(1+2\eta_1) + \frac{\frac{1}{2}(V_1^4\gamma^2\xi_1^2 - V_1^2 V_2^2 \xi_1 \xi_2)\left(\frac{\partial u}{\partial y}\right)^2 + V_1^2 V_z^2 \eta_1\left(\frac{\partial u}{\partial z}\right)^2}{(1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2} +$$

$$\frac{\frac{1}{3}CC\left(\frac{\partial u}{\partial y}\right)^2\left(\frac{\partial u}{\partial z}\right)^2}{\left((1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2\right)^2}$$

$$P = V_2^2(1+2\eta_2) + \frac{\frac{1}{2}(V_1^4\gamma^2\xi_1^2 - V_1^2 V_2^2 \xi_1 \xi_2)\left(\frac{\partial u}{\partial x}\right)^2 + V_2^2 V_z^2 \eta_2\left(\frac{\partial u}{\partial z}\right)^2}{(1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2} +$$

$$\frac{\frac{1}{3}CC\left(\frac{\partial u}{\partial x}\right)^2\left(\frac{\partial u}{\partial z}\right)^2}{\left((1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2\right)^2}$$

$$Q = V_z^2 + \frac{\frac{1}{2}V_z^2\left(V_1^2\eta_1\left(\frac{\partial u}{\partial x}\right)^2 + V_2^2\eta_2\left(\frac{\partial u}{\partial z}\right)^2\right)}{(1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2} +$$

$$\frac{\frac{1}{3}CC\left(\frac{\partial u}{\partial x}\right)^2\left(\frac{\partial u}{\partial y}\right)^2}{\left((1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2\right)^2}$$

wherein $\xi_1$, $\xi_2$, $\eta_1$, $\eta_2$, $V_1$, $V_2$, $\gamma$ and $CC$ are defined by using the Thomsen parameters that are in turn also defined from the stiffness tensor $c_{ijkl}$.

If the "1" index represents the "x" coordinate and "2" the "y" coordinate, then the horizontal velocity in the "x" direction and the horizontal velocity in the "y" direction are:

$$V_1 = v_1\sqrt{1+2\eta_1}$$

and $$V_2 = v_2\sqrt{1+2\eta_2}$$

respectively, being $$\eta_1 = \frac{c_{11}(c_{33}-c_{55})}{2c_{13}(c_{13}+2c_{55})+2c_{33}c_{55}} - \frac{1}{2}$$

$$\eta_2 = \frac{c_{22}(c_{33}-c_{44})}{2c_{23}(c_{23}+2c_{44})+2c_{33}c_{44}} - \frac{1}{2}$$

and the quantity $$\gamma = \sqrt{1+2\delta}$$

being $$\delta = \frac{(c_{12}+c_{66})^2 - (c_{11}-c_{66})^2}{2c_{11}(c_{11}-c_{66})}$$

Finally, $\xi_1 = 1+2\eta_1$, $\xi_2 = 1+2\eta_2$, and $$CC = 2V_1^3 V_2 V_z^2 \gamma \xi_1 - V_1^4 V_z^2 \gamma^2 \xi_1^2 - V_1^2 V_2^2 V_z^2(1-4\eta_1\eta_2)$$

DESCRIPTION OF THE DRAWINGS

These and other features and advantages of the invention will be seen more clearly from the following detailed description of a preferred embodiment provided only by way of illustrative and non-limiting example in reference to the attached drawings.

DETAILED DESCRIPTION OF THE INVENTION

Figure 1:
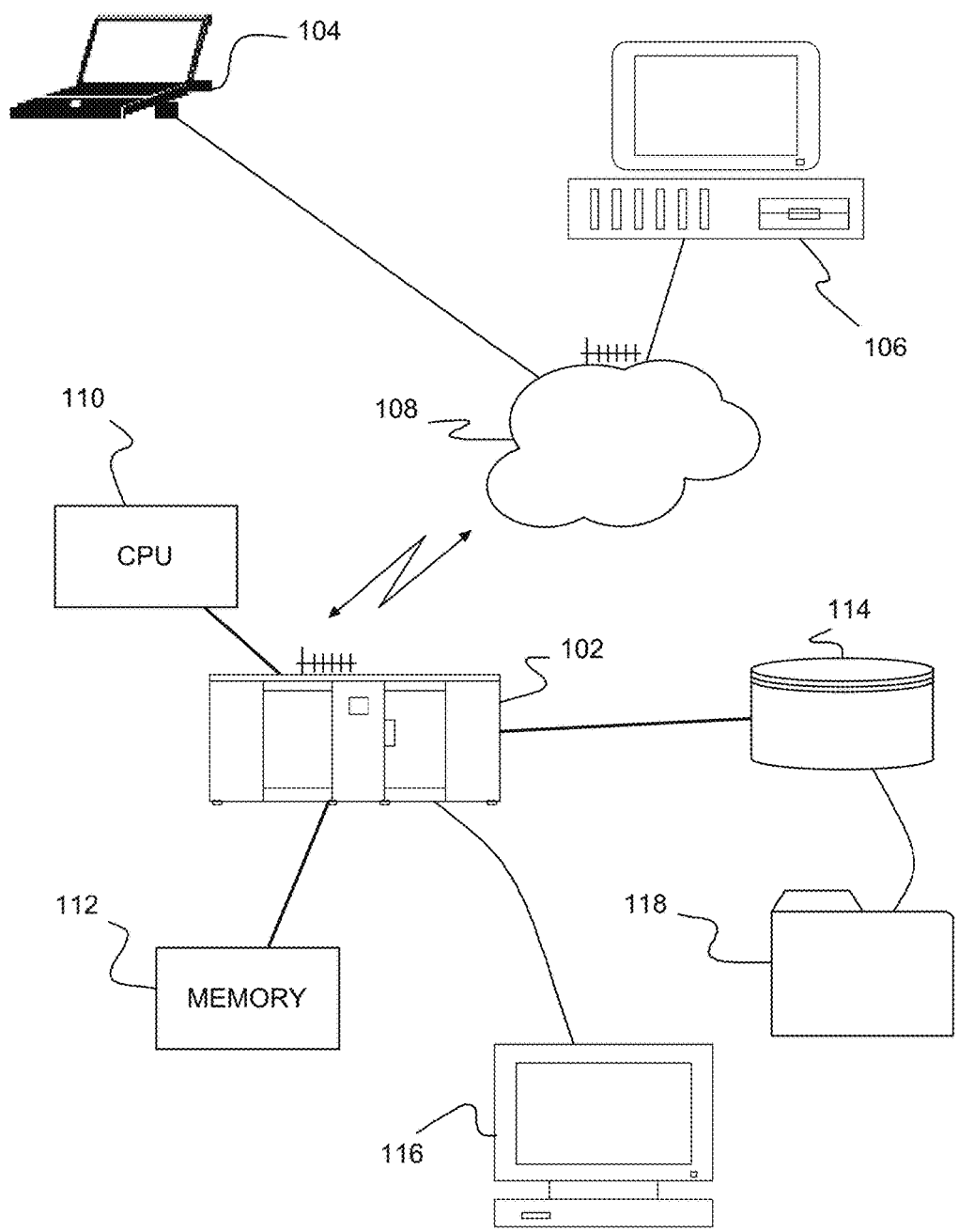
FIG. 1 This figure shows a data processing system for carrying out a method according to the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to illustrations and/or diagrams of methods, apparatus (systems) and computer program products according to embodiments of the invention. It will be understood that each illustration can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the drawings and more particularly, FIG. 1 shows an example of a data processing system 100 for the simulation of the acoustic wave propagation in the transversely isotropic media, according to a preferred embodiment of the present invention.

The preferred data processing system 100 determines a wavefield in an efficient manner free of noise, in particular without shear wave content.

A preferred data processing system 100 includes one or more computers 102, 104, 106 (3 in this example), coupled together, e.g., wired or wirelessly over a network 108. The network 108 may be, for example, a local area network (LAN), the Internet, an intranet or a combination thereof. Typically, the computers 102, 104, 106 include one or more processors, e.g., central processing unit (CPU) 110, memory 112, local storage 114 and some form of input/output device 116 providing a user interface. The local storage 114 may store and/or include earth models, in particular velocity fields and acoustic impedance data, computed wavefields; and raw data obtained from experiments carried out in specifics fields; being accessible by the plurality of computers 102, 104, 106, processing data by using the claimed propagator.

Figure 2:
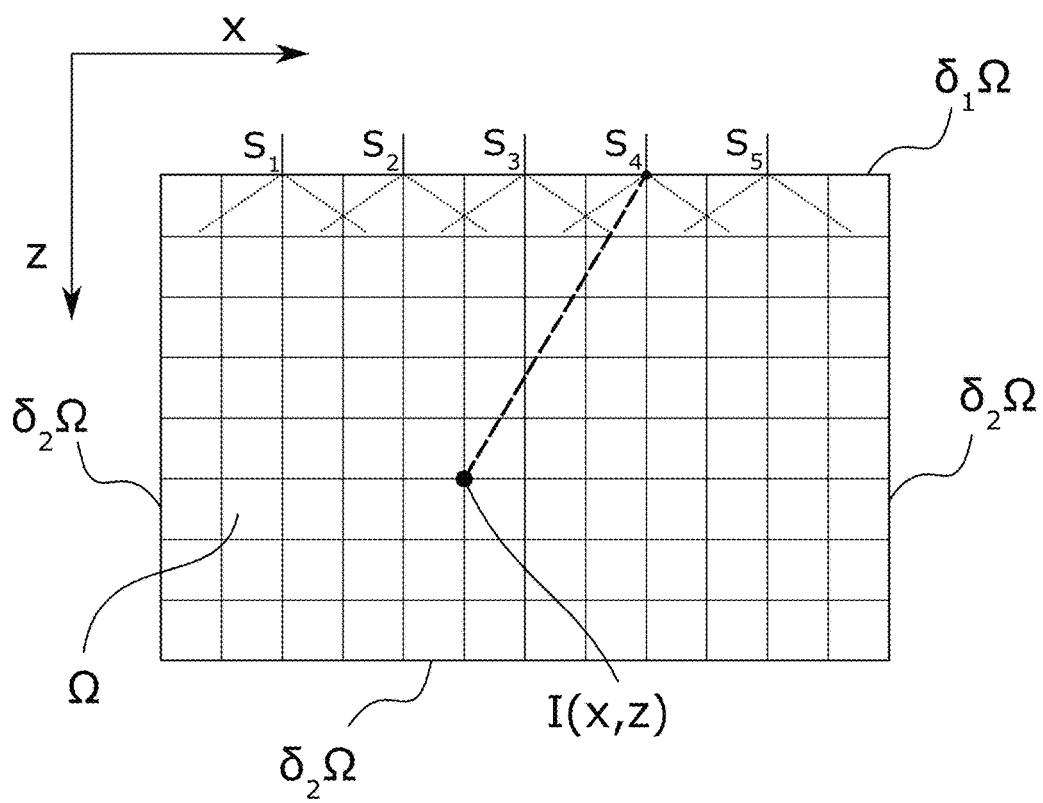
FIG. 2 This figure shows the domain of a numerical model being simulated by an example of method according to the invention.

FIG. 2 shows an embodiment of the invention wherein a region of the earth comprising an oil reservoir is being limited by a domain ($\Omega$). The domain ($\Omega$) is also the numerical domain where the equations are solved. Given an earth model, the domain ($\Omega$) is populated with at least the vertical velocity field $V_z$. Additional rock properties or velocity field values may be populated.

The domain ($\Omega$) is limited by a first boundary ($\delta_1\Omega$) comprising the points of the surface of the earth region, and a second boundary ($\delta_2\Omega$) corresponding to the subsurface points of the boundary of the domain ($\Omega$).

Once the boundary conditions and the initial condition are set, the wave propagation is determined by solving forward in time the earth model in the domain by using the wavefield propagator, that is, $$\frac{1}{V_z^2}\frac{d^2 u}{dt^2} = (1+2\varepsilon)\left(\frac{\partial^2 u}{\partial x^2} + \frac{\partial^2 u}{\partial y^2}\right) + \frac{\partial^2 u}{\partial z^2} + (\varepsilon-\delta)\frac{\left(\left(\frac{\partial u}{\partial x}\right)^2 + \left(\frac{\partial u}{\partial y}\right)^2\right)\frac{\partial^2 u}{\partial z^2} + \left(\frac{\partial u}{\partial z}\right)^2\left(\frac{\partial^2 u}{\partial x^2} + \frac{\partial^2 u}{\partial y^2}\right)}{(1+2\varepsilon)\left(\left(\frac{\partial u}{\partial x}\right)^2 + \left(\frac{\partial u}{\partial y}\right)^2\right) + \left(\frac{\partial u}{\partial z}\right)^2},$$

This equation is solved only for one wavefield component variable u reducing the computational cost of solving two coupled equations.

FIG. 2 shows a 2D domain ($\Omega$) wherein only the x horizontal coordinate and the depth z coordinate are relevant.

Al terms comprising the y variable are neglected, being the equation simplified as:

$$\frac{1}{V_z^2}\frac{d^2 u}{dt^2} = (1+2\varepsilon)\left(\frac{\partial^2 u}{\partial x^2}\right) + \frac{\partial^2 u}{\partial z^2} + (\varepsilon-\delta)\frac{\left(\frac{\partial u}{\partial x}\right)^2\frac{\partial^2 u}{\partial z^2} + \left(\frac{\partial u}{\partial z}\right)^2\left(\frac{\partial^2 u}{\partial x^2}\right)}{(1+2\varepsilon)\left(\frac{\partial u}{\partial x}\right)^2 + \left(\frac{\partial u}{\partial z}\right)^2}.$$

For a subsurface point I(x, y) the two way propagation between a determined acoustic source ($S_4$) is depicted by a dashed line.

The examples shown in pictures 3a, 3b, 4a and 4b has been integrated by using a finite-differences method by imposing a 10 hz of dominant frequency Ricker wavelet as source and wherein the size of the spatial grid is dx=dy=dz=25 m.

Figure 3B:
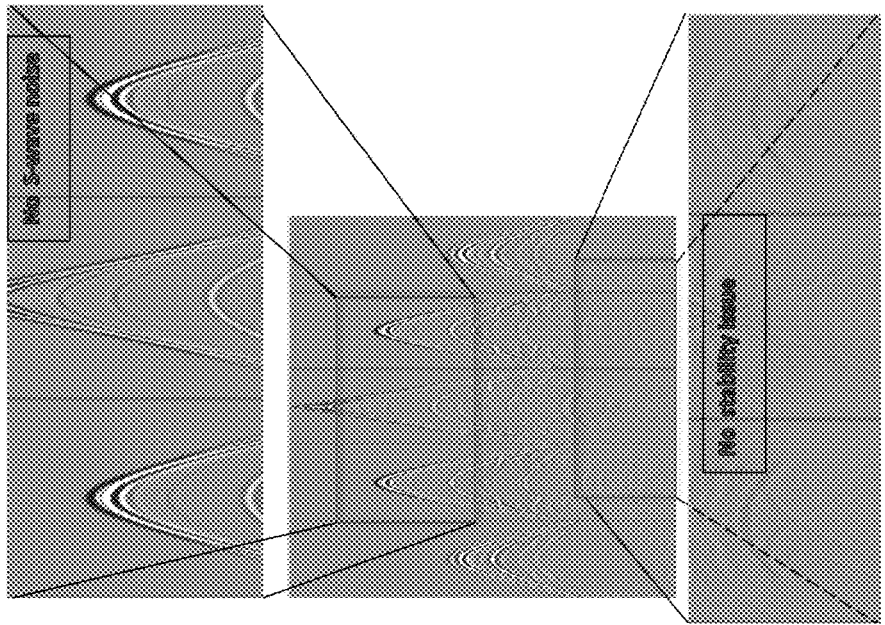
FIG. 3b This figure shows the same example being simulated with a propagator according to step d) wherein neither S-wave noise nor instabilities are being generated.
Figure 3A:
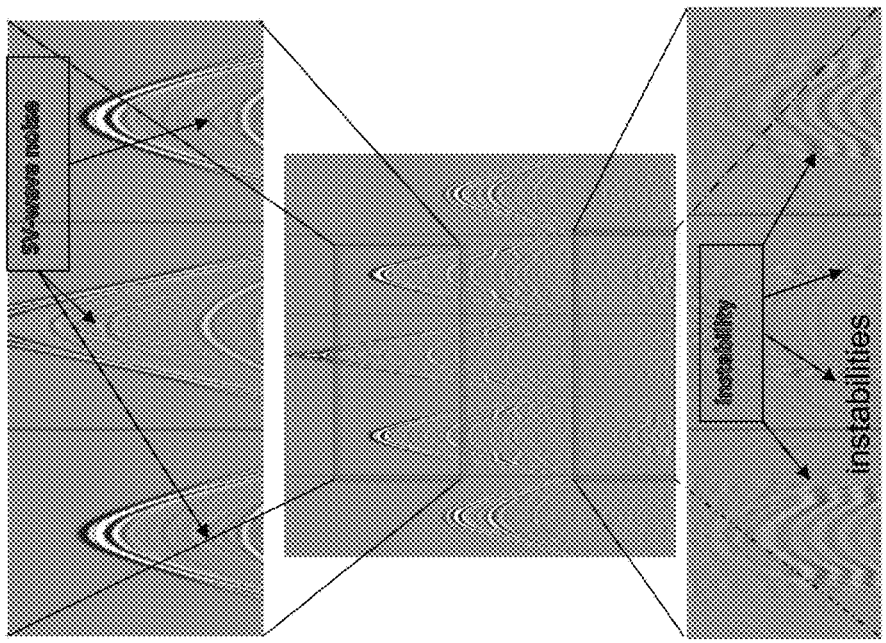
FIG. 3a This figure shows a wavefield being simulated according to a two-equations based propagator in an example of the invention showing the s-wave noise and instabilities.

FIG. 3a shows a wavefield being simulated according to two-equations based propagator showing the s-wave noise and instabilities. The upper part of the wavefield has been magnified allowing to show the crimped region due to the noise generation. The arrows points to the locations where the shear-waves noise exists.

The lower part also shows a distorted area within the wave fronts that have been magnified in the lower part of FIG. 3a.

The largest amplitudes do not satisfy geometry spreading and transmission/reflection amplitude rules. This issue is due to the existence of much lower shear-waves leading to a wavefield which is not stable when using the same time step used to integrate numerically higher acoustic p-waves.

The same example has been simulated by using the equation according to step d) according to the invention. The same parts of the new wavefield are magnified on FIG. 3b showing that the same regions are noise free and without instabilities.

Figures 4A, 4B:
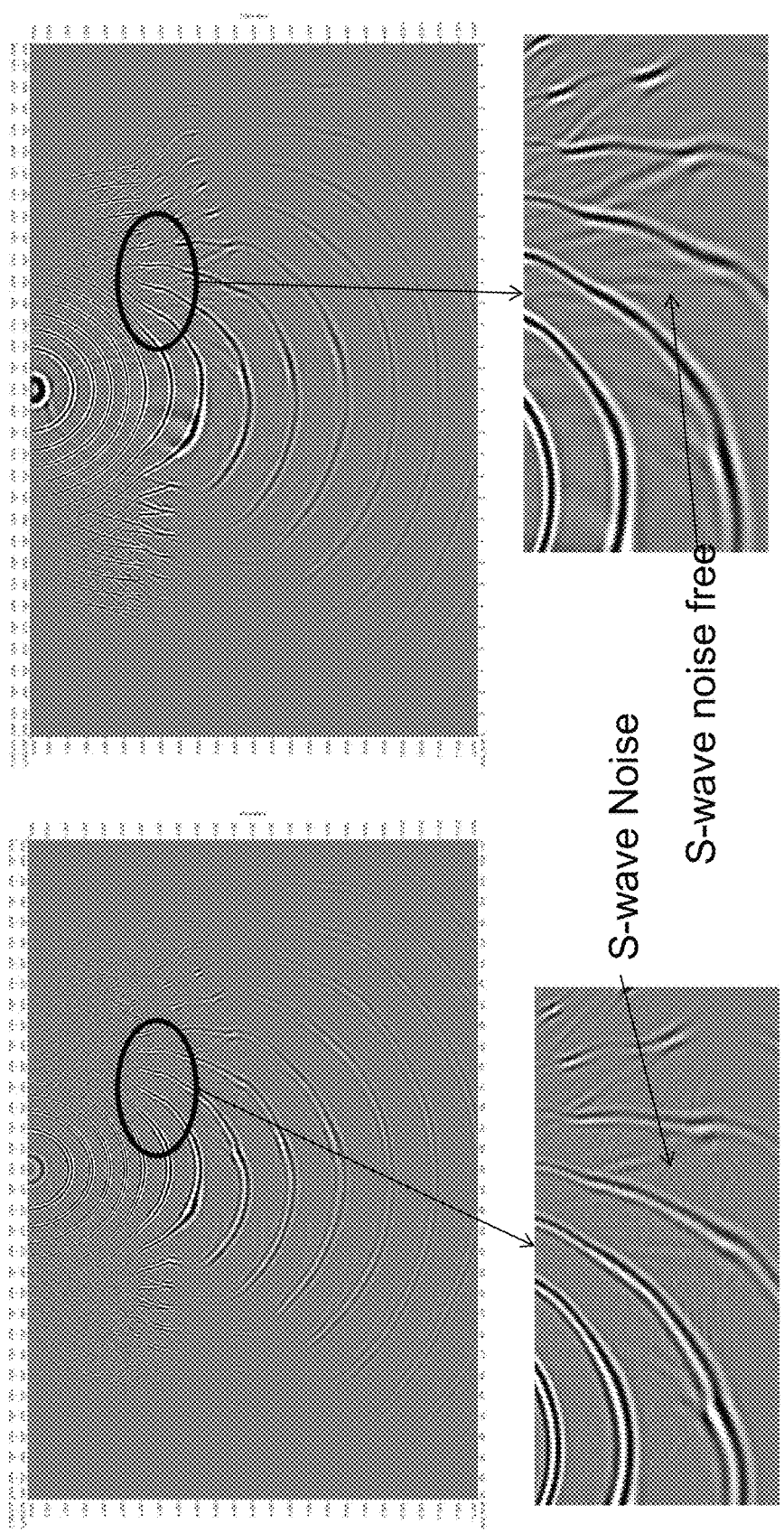
FIG. 4a This figure shows a wavefield being simulated according to a two-equations based propagator in another example when a single shot generates a wavefield. In this figure the scale of the image is not clearly shown as it is not relevant for the purpose of the teachings disclosed.
FIG. 4b This figure shows the same example being simulated with a propagator according to step d) wherein neither S-wave noise nor instabilities are being generated.

A new embodiment is being simulated by using a single shot in the middle of the surface. FIG. 4a shows a wavefield being simulated according to a two-equation based propagator showing a region identified with an oval where the S-wave noise generates a distorted image. The arrows points to the locations where the shear-waves noise exists.

FIG. 4b shows an RTM result for an impulse response with marine data. It shows the same example being simulated with a propagator according to step d) of the invention wherein neither S-wave noise nor instabilities are being generated. The plot does not have the shear-waves noise and appears very clean.

The method according to the invention may also be used for other applications such as reversed time migration of images. In this particular example the propagator used for the source wavelet of the forward modeling and the propagator used for the time reversed seismic common shot gather are the same, that identified in step d) of the present invention.

Figure 5:
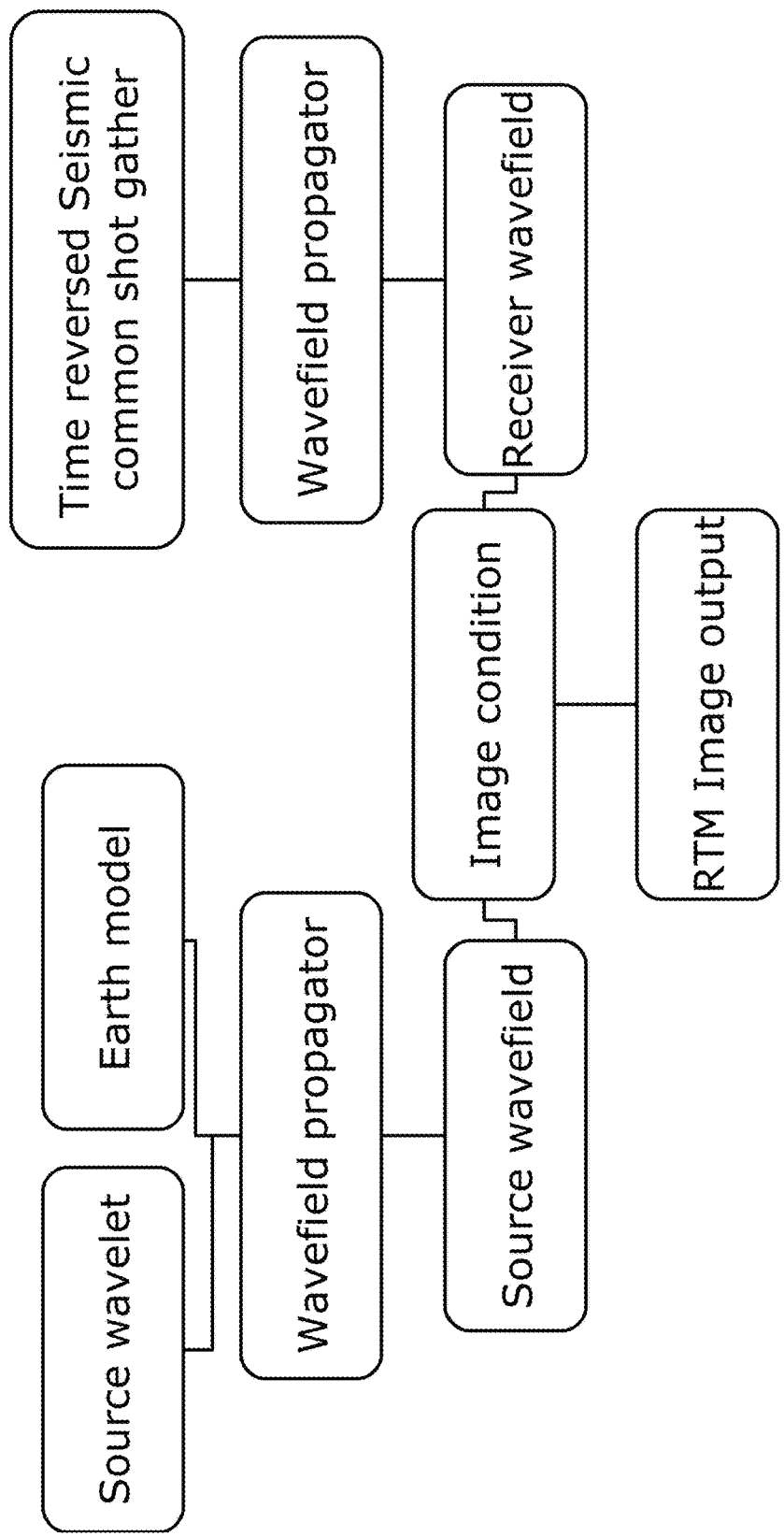
FIG. 5 This figure is an scheme showing that the reverse time migration RTM and forward modeling share the same wavefield propagator.

FIG. 5 shows the revers time migration workflow. The left part of the figure identifies the forward modeling wherein the source wavelet is determined in the domain ($\Omega$), and the earth model provides the properties being populated in said domain ($\Omega$).

The boundary and initial conditions allows to integrate the initial value problem stated by equation of step d), then obtaining as a result the source wavefield.

This process is identified as a particular embodiment of the method of the invention deeming that (step i):

step b) is carried out by providing a recorded seismic field data and with a given estimation of the earth model in the domain ($\Omega$);

step c) is carried out by determining the acoustic source from the recorded seismic field data;

step e) provides a time migrated seismic source wavefield.

The right part of figure identifies the time reversed seismic common shot gather which provides the boundary and initial conditions to be used when solving the wavefield propagator.

The result is a receiver wavefield as it is shown at the end of the right branch of the scheme.

This process is also identified as a particular embodiment of the method of the invention deeming that:

step b) is determined by using the same estimated earth model as that used in step i);

step c) is carried out by providing the time reversed seismic data as boundary conditions or initial conditions;

step e) provides a reconstructed receiver wavefield.

A cross-correlation image between the source wavefield and the receiver wavefield provides an estimated earth structure in the domain ($\Omega$), the RTM Image output.

The invention claimed is:

1. A computer-implemented method for simulating acoustic wave propagation in a transversely isotropic media comprising an hydrocarbon reservoir, the method comprising the steps of:
   a) determining a domain ($\Omega$) comprising the reservoir, wherein said domain ($\Omega$) comprises subsurface points and surface points ($\delta_1\Omega$);
   b) populating the domain ($\Omega$) with properties of an earth model, wherein said earth model at least comprises velocity field $V_z$ along a direction of a symmetry axis of the transversely isotropic media;
   c) determining boundary conditions for boundaries ($\delta_2\Omega$) corresponding to the subsurface points and boundary conditions ($\delta_1\Omega$) comprising one or more predetermined acoustic sources emitting at certain frequency located at the surface ($\delta\Omega$) of the domain ($\Omega$), and initial conditions;
   d) simulating the propagation of acoustic waves through the domain ($\Omega$) by generating a wavefield having only P-wave components, wherein generating the wavefield includes automatically solving forward in time the earth model in the domain using a wavefield propagator defined by:

$$\frac{1}{V_z^2}\frac{d^2 u}{dt^2} = (1+2\varepsilon)\left(\frac{\partial^2 u}{\partial x^2}+\frac{\partial^2 u}{\partial y^2}\right)+\frac{\partial^2 u}{\partial z^2}+$$
$$(\varepsilon-\delta)\frac{\left(\left(\frac{\partial u}{\partial x}\right)^2+\left(\frac{\partial u}{\partial y}\right)^2\right)\frac{\partial^2 u}{\partial z^2}+\left(\frac{\partial u}{\partial z}\right)^2\left(\frac{\partial^2 u}{\partial x^2}+\frac{\partial^2 u}{\partial y^2}\right)}{(1+2\varepsilon)\left(\left(\frac{\partial u}{\partial x}\right)^2+\left(\frac{\partial u}{\partial y}\right)^2\right)+\left(\frac{\partial u}{\partial z}\right)^2}$$

wherein the u is the wavefield, $\varepsilon$ and $\delta$ are the anisotropic parameters, (x, y) are the spatial coordinates at the surface ($\delta_1\Omega$) of the domain ($\Omega$) and z the spatial coordinate in the depth direction and t the time coordinate; and,
   e) making available the wavefield determined on the domain ($\Omega$).

2. The method according to claim 1, wherein a plurality of receivers are located in the domain ($\Omega$) and, after step d) the values calculated at the receiver locations are provided.

3. The method according to claim 1, wherein the boundary conditions for the boundaries corresponding to the subsurface points are absorbing free conditions.

4. The method according to claim 1, wherein:
   a) the initial conditions comprises a plurality of receivers located at predetermined locations of the surface of the domain being simulated;
   b) the wavefield generated by the acoustic sources are being interpolated and gathered in each receiver; and,
   c) the output of the receivers are made available.

5. A method of operating a data-processing system for a reverse time migration simulation, the method comprising the steps of:
   i. implementing the method according to claim 1 wherein:
      step b) is carried out by providing a recorded seismic field data and with a given estimation of the earth model in the domain ($\Omega$);
      step c) is carried out by automatically determining, via the data-processing system, the acoustic source from the recorded seismic field data;
      step e) provides a time migrated seismic source wavefield;
   ii. implementing the method according to claim 1 wherein:
      step b) is determined by using the same estimated earth model as that used in step i);
      step c) is carried out by automatically providing, via the data-processing system, the time reversed seismic data as boundary conditions or initial conditions;
      step e) provides a reconstructed receiver wavefield,
   iii. automatically generating, via the data-processing system, a cross-correlation image between the source wavefield of step ii) and the receiver wavefield of step iii) and provide an estimated structure of the earth model in the domain ($\Omega$).

6. The method according to claim 5 wherein the cross-correlation image is used as the gradient of the velocity field being used to update the estimated earth model; and steps i)-iii) are iteratively applied until convergence of the new estimated earth structure in the domain ($\Omega$).

7. The method according to claim 1, wherein the integration of the partial differential equations is by using a space discretization based method.

8. The method according to claim 1, wherein the reservoir is tilted and the equation of step d) is rotated such that:

$$\frac{1}{V^2}\frac{d^2 u}{dt^2} = [pa_{xy}\ pa_{az}]\begin{bmatrix}xy_{11} & z_{13}\\xy_{21} & z_{23}\\xy_{31} & z_{33}\\xy_{41} & z_{43}\\xy_{51} & z_{53}\\xy_{61} & z_{63}\end{bmatrix}\begin{bmatrix}\frac{\partial^2 u}{\partial x^2}\\\frac{\partial^2 u}{\partial y^2}\\\frac{\partial^2 u}{\partial z^2}\\\frac{\partial^2 u}{\partial x\partial y}\\\frac{\partial^2 u}{\partial y\partial z}\\\frac{\partial^2 u}{\partial z\partial x}\end{bmatrix} \text{ where}$$

$$pa_{xy} = (1+2\varepsilon)V^2+(\varepsilon-\delta)V^2\frac{\left(\frac{\partial u}{\partial z}\right)^2}{(1+2\varepsilon)\left(\left(\frac{\partial u}{\partial x}\right)^2+\left(\frac{\partial u}{\partial y}\right)^2\right)+\left(\frac{\partial u}{\partial z}\right)^2};$$

$$pa_{az} = (1+2\varepsilon)V^2+(\varepsilon-\delta)V^2\frac{\left(\frac{\partial u}{\partial x}\right)^2+\left(\frac{\partial u}{\partial y}\right)^2}{(1+2\varepsilon)\left(\left(\frac{\partial u}{\partial x}\right)^2+\left(\frac{\partial u}{\partial y}\right)^2\right)+\left(\frac{\partial u}{\partial z}\right)^2};$$

$$z_{13} = \cos^2(\phi)\cdot(1-\cos^2(\theta));$$

$$xy_{21} = \cos^2(\theta)*(1-\cos^2(\phi))+\cos^2(\phi);$$

$$z_{33} = \cos^2(\theta);$$

$$z_{43} = 2(1-\cos^2(\theta))\cdot\sin(\phi)\cos(\phi);$$

$$xy_{51} = 2\sin(\theta)\cos(\theta)\cdot\sin(\phi);$$

$$xy_{61} = 2\sin(\theta)\cos(\theta)\cdot\cos(\phi);$$

$$xy_{11} = 1-z_{13};$$

$$z_{23} = 1-xy_{21};$$

-continued $xy_{31} = 1 - z_{33};$ $xy_{41} = 1 - z_{43};$ $z_{53} = 1 - xy_{51};$ $z_{63} = 1 - xy_{61}.$ 9. The method according to claim 1, wherein the wavefield propagator of step d) is based on the elastic stiffness tensor element further comprising orthorhombic parameters, wherein said propagator is defined by:

$$\frac{d^2 u}{dt^2} = N\frac{\partial^2 u}{\partial x^2} + P\frac{\partial^2 u}{\partial y^2} + Q\frac{\partial^2 u}{\partial z^2} \text{ where}$$

$$N = V_1^2(1+2\eta_1) + \frac{\frac{1}{2}(V_1^4\gamma^2\xi_1^2 - V_1^2 V_2^2 \xi_1 \xi_2)\left(\frac{\partial u}{\partial y}\right)^2 + V_1^2 V_z^2 \eta_1 \left(\frac{\partial u}{\partial z}\right)^2}{(1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2} +$$

$$\frac{\frac{1}{3}CC\left(\frac{\partial u}{\partial y}\right)^2\left(\frac{\partial u}{\partial z}\right)^2}{\left((1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2\right)^2}$$

$$P = V_2^2(1+2\eta_2) + \frac{\frac{1}{2}(V_1^4\gamma^2\xi_1^2 - V_1^2 V_2^2 \xi_1 \xi_2)\left(\frac{\partial u}{\partial x}\right)^2 + V_2^2 V_z^2 \eta_2 \left(\frac{\partial u}{\partial z}\right)^2}{(1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2} +$$

$$\frac{\frac{1}{3}CC\left(\frac{\partial u}{\partial x}\right)^2\left(\frac{\partial u}{\partial z}\right)^2}{\left((1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2\right)^2}$$

$$Q = V_z^2 + \frac{\frac{1}{2}V_z^2\left(V_1^2\eta_1\left(\frac{\partial u}{\partial x}\right)^2 + V_2^2\eta_2\left(\frac{\partial u}{\partial z}\right)^2\right)}{(1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2} +$$

$$\frac{\frac{1}{3}CC\left(\frac{\partial u}{\partial x}\right)^2\left(\frac{\partial u}{\partial y}\right)^2}{\left((1+2\eta_1)V_1^2\left(\frac{\partial u}{\partial x}\right)^2 + (1+2\eta_2)V_2^2\left(\frac{\partial u}{\partial y}\right)^2 + V_z^2\left(\frac{\partial u}{\partial z}\right)^2\right)^2}$$

wherein, when the "1" index represents the "x" coordinate and the "2" index represents the "y" coordinate, the horizontal velocity in the "x" direction and the horizontal velocity in the "y" direction are, respectively:

$$V_1 = v_1\sqrt{1+2\eta_1}$$

and $$V_2 = v_2\sqrt{1+2\eta_2}$$

wherein $$\eta_1 = \frac{c_{11}(c_{33} - c_{55})}{2c_{13}(c_{13} + 2c_{55}) + 2c_{33}c_{55}} - \frac{1}{2}$$

$$\eta_2 = \frac{c_{22}(c_{33} - c_{44})}{2c_{23}(c_{23} + 2c_{44}) + 2c_{33}c_{44}} - \frac{1}{2}$$

and, the quantity $$\gamma = \sqrt{1+2\delta}$$

wherein $$\delta = \frac{(c_{12} + c_{66})^2 - (c_{11} - c_{66})^2}{2c_{11}(c_{11} - c_{66})}$$

$$\xi_1 = 1 + 2\eta_1$$

$$\xi_2 = 1 + 2\eta_2$$

and $$CC = 2V_1^3 V_2 V_z^2 \gamma \xi_1 - V_1^4 V_z^2 \gamma^2 \xi_1^2 - V_1^2 V_2^2 V_z^2 (1 - 4\eta_1 \eta_2).$$

10. A non-transitory computer program product stored on a computer-readable medium and comprising computer-implementable instructions, which, when executed by a computer, cause the computer to carry out the method according to claim 1.

11. An electronic device for processing data, the device comprising:
a processor; and
a non-transitory computer readable medium storing computer-executable instructions which, when executed by the processor, cause the processor to carry out the method according to claim 1.

\* \* \* \* \*